(12) United States Patent
Trager

(10) Patent No.: US 8,605,224 B2
(45) Date of Patent: Dec. 10, 2013

(54) DIGITAL INTERFACE FOR TUNER-DEMODULATOR COMMUNICATIONS

(75) Inventor: David Trager, San Marcos, TX (US)

(73) Assignee: Silicon Laboratories Inc., Austin, TX (US)

( * ) Notice: Subject to any disclaimer, the term of this patent is extended or adjusted under 35 U.S.C. 154(b) by 1634 days.

(21) Appl. No.: 12/072,642

(22) Filed: Feb. 27, 2008

(65) Prior Publication Data

US 2009/0213275 A1    Aug. 27, 2009

(51) Int. Cl.
 *H04N 5/38* (2006.01)
 *H04N 5/44* (2011.01)
 *H04N 5/455* (2006.01)

(52) U.S. Cl.
 USPC .......................... 348/725; 348/723; 348/726

(58) Field of Classification Search
 USPC .......................... 348/723, 725, 726
 See application file for complete search history.

(56) References Cited

U.S. PATENT DOCUMENTS

| | | | |
|---|---|---|---|
| 5,668,830 A * | 9/1997 | Georgiou et al. ............. | 375/220 |
| 6,298,400 B1 * | 10/2001 | Candelore ..................... | 710/71 |
| 6,441,860 B1 * | 8/2002 | Yamaguchi et al. .......... | 348/555 |
| 6,661,251 B1 * | 12/2003 | Dowen et al. .................. | 326/37 |
| 6,687,315 B2 | 2/2004 | Keevill et al. ................. | 375/341 |
| 6,792,003 B1 * | 9/2004 | Nair et al. ...................... | 370/476 |
| 7,778,370 B2 * | 8/2010 | Aytur et al. .................... | 375/365 |
| 2003/0044166 A1 * | 3/2003 | Haddad .......................... | 386/111 |
| 2006/0001779 A1 * | 1/2006 | Favrat et al. ................... | 348/725 |
| 2007/0230513 A1 * | 10/2007 | Talbot et al. ................... | 370/516 |

OTHER PUBLICATIONS

U.S. Appl. No. 11/903,910, filed Sep. 25, 2007, entitled "Reducing Data Stream Jitter During Deinterleaving," by Frederic Nicolas.
Silicon Laboratories, "SiRX™ Single-Chip RF Front-End for Digital Satellite TV," Nov. 2005, pp. 1-10.
Silicon Laboratories, "Si2107/08/09/10," Jun. 2006, pp. 21-28.

* cited by examiner

*Primary Examiner* — Pankaj Kumar
*Assistant Examiner* — Alazar Tilahun
(74) *Attorney, Agent, or Firm* — Trop, Pruner & Hu, P.C.

(57) ABSTRACT

An apparatus may include analog tuner circuitry, a digital unit to process incoming data, an analog interface to receive the processed data for conversion back into analog signals, and a first pin to output the analog signals on a link. A separate digital interface may be present and can be enabled to receive the processed data and encode it into a serial bit stream for transmission via the first pin, avoiding the need for the analog interface to operate when the digital interface is enabled.

19 Claims, 9 Drawing Sheets

DIGITAL INTERFACE FOR TUNER-DEMODULATOR COMMUNICATIONS

BACKGROUND

In a television receiver, a tuner is used to convert a radio frequency (RF) signal to an intermediate frequency (IF) or baseband signal, and a demodulator is used to remove the signal modulation added for transmission. Traditionally, the tuner and demodulator are implemented in separate chips or modules. The IF or baseband signal is typically sent from the tuner to demodulator as a real analog signal, or complex analog signal. This requires analog-to-digital (A/D) conversion in the demodulator chip. The inclusion of the A/D function in a largely digital demodulator chip adds complexity and cost.

Recently, tuners have been developed that perform some of their signal processing in the digital domain. Hence they have an A/D conversion function. Such tuners therefore also provide a digital-to-analog (D/A) conversion capability to allow them to interface with traditional demodulators. This adds redundancy in the form of D/As in the tuner and A/Ds in the demodulator that waste power, area, and add complexity to the development of these chips.

SUMMARY OF THE INVENTION

One aspect of the present invention is directed to an apparatus that includes an analog front end to receive incoming radio frequency (RF) signals including television data and convert the incoming RF signals to baseband digital signals, a digital unit to process the baseband digital signals, an analog interface to receive the processed baseband digital signals and convert the signals back into analog signals, and a first pin to output the analog signals on a link. Still further, the apparatus can have a digital interface to receive the processed baseband digital signals and to encode them into a serial bit stream for transmission via the first pin, avoiding the need for the analog interface to operate when the digital interface is enabled.

In one implementation, the digital interface can be configured to receive data samples having varying bit widths and reformat them into a packet of a fixed size, where the packet includes a varying number of the digital samples based on the bit width. Further, the digital interface can be configured to dynamically change a frequency of frame synchronization transmission sent between data frames formed of multiple packets based on feedback information from a receiver.

The digital interface may include, in one implementation a first-in-first-out (FIFO) buffer, a re-formatter to reformat the data samples to a predetermined bit width, a scrambler to scramble the reformatted data samples, an encoder to encode the scrambled data samples, and a serializer to serialize the encoded data samples and output the serial bit stream.

Another aspect of the present invention is directed to a method for receiving, in a digital interface, data samples having a given bit width along with a control signal to indicate the width, packing the data samples into a packet having a fixed size with differing amounts of data samples based on the bit width, and transmitting the packet as a serial bit stream. A clock signal can be sent synchronously with the serial bit stream, where the clock signal is asynchronous with a different second clock signal at which a remainder of the transmitter operates. This clock signal can be dynamically adjusted to avoid interference with analog circuitry of the transmitter.

Yet another aspect of the present invention is directed to a system that includes a television tuner including an analog front end, digital unit that operates at a first clock frequency that is dynamically controlled to avoid interference with the analog front end, and a digital interface to encode processed digital signals into a serial bit stream to be transmitted from the television tuner at a second frequency at which the digital interface operates asynchronously with the first clock frequency. The system may further include a demodulator coupled to the television tuner by a link and having a digital interface to receive and process the serial bit stream.

Yet another aspect of the present invention is directed to communication between a transmitter and receiver, where there can be a limited amount of signal lines, e.g., a single differential pair to transmit all data, clock and control information. To aid in this technique, the receiver (and/or transmitter) can include a variable impedance coupled to its input line, where the receiver can dynamically adjust the variable impedance to provide control information to the transmitter (or vice versa). Control information may also be encoded in predetermined symbols of a communication protocol used. To determine the impedance changes, the devices may include sensing circuitry, such as a comparator to compare a voltage of the differential pair to a reference voltage and provide the comparison results to a controller or other such circuitry.

DETAILED DESCRIPTION

In various embodiments, a digital interface may be provided between a transmitter and receiver such as a tuner and a demodulator, which may be different semiconductor components of a television receiver. This digital interface may be used when both tuner and demodulator of a given system have a capability to communicate via such a digital interface. In this way, the power consumption associated with analog circuitry of both the tuner and demodulator to convert digital information to an analog signal for transmission to the demodulator and in the demodulator to convert this analog information back to a digital form can be avoided. Such circuitry may include various analog components such as a digital-to-analog converter (DAC), filters, buffers and so forth of the tuner, and analog circuitry such as an analog-to-digital converter (ADC) and phase lock loop (PLL) of the demodulator. Furthermore, future generations of such tuners and demodulators may be designed without this analog circuitry, reducing chip real estate and simplifying design.

Figure 1:
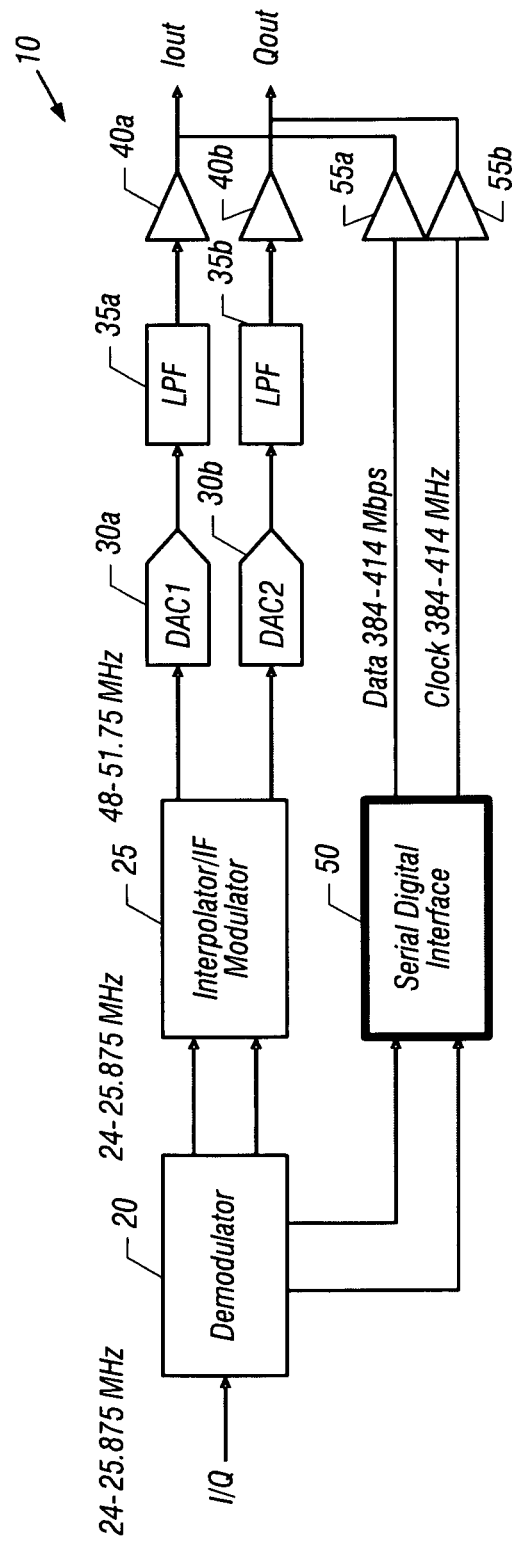
FIG. 1 is a block diagram of a portion of a transmitter in accordance with one embodiment of the present invention.

Referring now to FIG. 1, shown is a block diagram of a portion of a transmitter in accordance with one embodiment of the present invention. Transmitter 10 may be part of a television tuner device. As shown in FIG. 1, tuner 10 may receive incoming I/Q samples, which may be received in digital form at a demodulator 20, which may be a channel selection filter (CSF)/analog television (ATV) demodulator. Demodulator 20 may thus perform functions with respect to channel selection filtering as well as demodulation of analog television signals. Channel selection filtering may digitally remove or filter out adjacent channels. For digital TV, demodulator 20 simply outputs channel data not demodulated yet.

Such demodulated signals, which are digitized, may be provided to an interpolator/IF modulator 25 that takes the incoming data at a first rate and interpolates the information to a higher rate such as twice its incoming frequency. For example, in one implementation incoming data may be provided at a rate of between approximately 24-25.875 megahertz (MHz) and may be output from interpolator/IF modulator 25 at 48-51.75 MHz. This digitized information is provided to a pair of DACs $30_a$ and $30_b$ (each respectively for a given I or Q channel), which act to convert the digital information to analog form. Low pass filters (LPF) $35_a$ and $35_b$ filter these signals, which are then buffered by buffers $40_a$ and $40_b$ and provided out as $I_{out}$ and $Q_{out}$, which are analog signals provided out of tuner 40, e.g., by way of pins of the semiconductor device. In various embodiments, such signals may be transmitted using low voltage differential signaling (LVDS), although the scope of the present invention is not limited in this regard. Thus while shown in FIG. 1 as a single output line from each of buffers 40a and 40b, in an implementation using LVDS or other differential signaling, a pair of conductors may be output for each of the I and Q channels shown in FIG. 1.

While this path commonly provides data in an analog form that can be used by many different downstream demodulators, embodiments may further provide a digital interface 50 to provide for digital communication along the same pins when used in a system having a demodulator capable of receiving digital signals. Thus as shown in FIG. 1, a serial digital interface (SDI) 50 is coupled to demodulator 20 to receive the digitized signals. SDI 50 may perform various interface functions to encode this digital data according to a given coding scheme and to provide a clock signal that is independent of the clock at which the circuitry of tuner 10 operates. Thus as shown in FIG. 1, SDI 50 outputs the data at a different rate, e.g., 384-414 megabits per second (Mbps) and also provides a clock signal at a corresponding rate of 384-414 MHz. Note that the data and clock outputs of SDI 50 may be synchronous; however, the clock output transmitted over the link is independent of sampling rates that are used to generate the data. In various embodiments, this clock may be provided at a variable frequency, and by varying this clock frequency, noise that could result in interference between the differing frequencies of analog and digital circuitry on a mixed signal chip may be avoided.

These separate clock and data lines from SDI 50 are provided to buffers $55_a$ and $55_b$, which in turn may be coupled to the same output lines $I_{out}$ and $Q_{out}$ to thus provide digital information along the same pins of the semiconductor device including tuner 10 when SDI 50 is enabled. By providing a serial digital interface to allow digital data transfer between tuner and demodulator, pin counts and clock frequency may be minimized. While shown with this particular implementation in the embodiment of FIG. 1, the scope of the present invention is not limited in this regard. However, in other embodiments, a clock need not be transmitted at all. Instead, the data is sent, which because a coding scheme used for communication, has a lot of transitions at higher frequency, so that a clock can be recovered from it.

Figure 2:
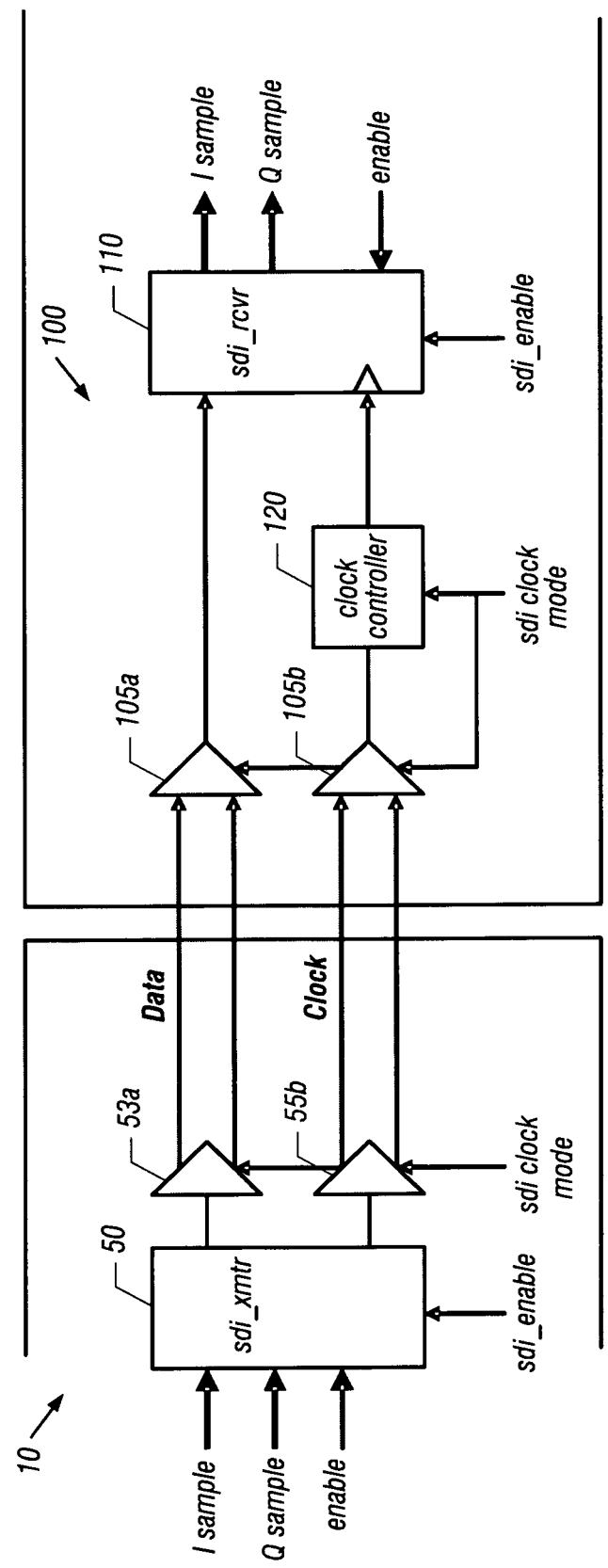
FIG. 2 is a block diagram of a portion of a system incorporating an embodiment of the present invention.

Referring now to FIG. 2, shown is a block diagram of a portion of a system incorporating an embodiment of the present invention. As shown in FIG. 2, a tuner 10 and a demodulator 100 are coupled by way of data lines and clock lines. In the embodiment shown in FIG. 2, the data lines may be differential serial lines that communicate from pins of tuner 10 to demodulator 100 using LVDS signaling circuitry. Similarly, the clock lines communicate between pins of the devices, where the clock signals are also transmitted using LVDS signaling. As shown in FIG. 2, only the serial digital interfaces of tuner 10 and demodulator 100 are shown. Note, however, that in various implementations, analog circuitry to provide a separate path to the pins of the chips may be present, to enable flexibility in system design. For example, when analog circuitry of tuner 10 is to output information to demodulator 100, the data lines may instead transmit I channel analog data and the clock lines may correspond to Q channel analog data.

As shown in FIG. 2, tuner 10 includes SDI 50 that receives incoming I and Q sample data. In addition, SDI 50 is enabled by an incoming enable signal, as well as via a clocking signal, sdi_enable. This incoming enable signal may be generated by the analog interface when it is ready to transmit data, so that SDI 50 is not enabled until the LVDS signal path is enabled. Buffers 55a and 55b coupled to SDI 50 may similarly be enabled by an "sdi clock mode" signal. In one embodiment, a controller of tuner 10 may have control registers that are set to cause the digital interface to be enabled, e.g., when associated with a demodulator that has a corresponding digital interface. Still further, based on other clock frequencies and incoming RF frequencies associated with an incoming television channel, the controller may cause digital interface 50 to generate the associated clock signal and to cause operation of digital interface 50 at a frequency that avoids interference with other clocks and analog circuitry of tuner 10, generally referred to herein as spur management, in that spurs or other noise that could be caused by harmonics of such clock frequencies may be avoided.

On the receive side, i.e., at demodulator 100, the differential data is provided to an input buffer 105a, and the incoming clock signals are provided to an input buffer 105b. Each buffer 105 is clocked by an "sdi clock mode" signal. The buffered data is provided to an SDI 110, while the received clock signal is provided to a clock controller 120 that accordingly provides a clock signal to SDI 110, which is enabled by a corresponding sdi_enable signal, e.g., from control register settings of a controller of demodulator 100, and an enable signal that is provided when an LVDS path of the demodulator has been enabled. SDI 110 operates to output the digital sample data, $I_{sample}$ and $Q_{sample}$, as clocked by the clock signal received from tuner 10. Thus SDI 50 (also referred to herein as a transmitter) converts the tuner parallel I and Q baseband samples into a serial bit stream, and SDI 110 (also referred to herein as a receiver) converts the serial bit stream back into parallel I and Q samples.

Thus as shown in FIG. 2 a separate signal, "sdi clock mode," enables the clocking and LVDS interface separately from the signal, sdi_enable, that enables the transmitter and receiver logical functionality. In the transmitter, the clocking of clock controller 120 and LVDS mode for the pads associated with the LVDS path is enabled, and then the logical function of the transmitter is enabled with the sdi_enable signal. In the receiver, it is expected that the LVDS mode for the pads and clock source selection is enabled, and then the logical function of the receiver is enabled with its sdi_enable signal. Note that when the digital interface is not present in a demodulator or the digital interface is not used, the circuitry shown in FIG. 2 (on both transmit and receive sides) may be disabled to reduce power consumption.

Figure 3:
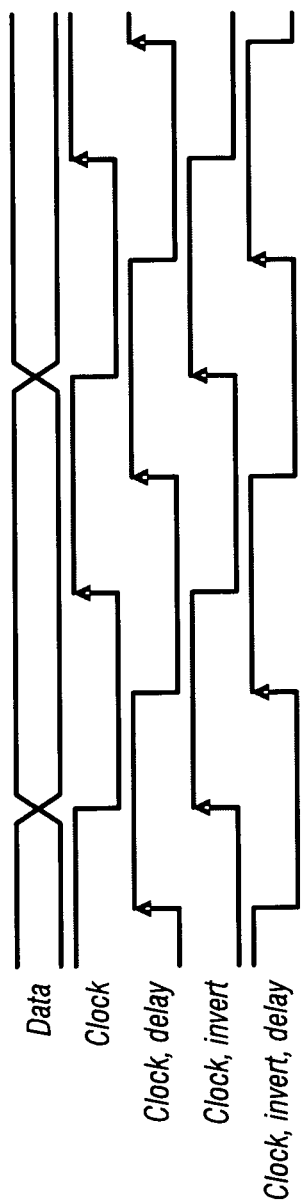
FIG. 3 is a timing diagram of clock phases available in one embodiment of the present invention.

The clock and data are normally sent with a specific relationship. In one embodiment, by default the negative edge of the clock is the launch clock for the data. The receiver may use the rising edge of the clock for capture. If no skew exists between the clock and data paths from the transmitter to the receiver, the default mode can be used. However, depending on the implementation of the transmitter, receiver, and board layout of the signal traces, some skew may be present. In this case, a selected one of various clock phases can be used, and which may be based on feedback information from the receiver, e.g., regarding error rate. In one implementation, the clock polarity can be inverted, and/or a ~¼ period delay can be added to the clock path. This will provide a total of 4 different clock/data timing relationships that can be used to provide robust reception. These different clock phases are shown in the timing diagram of FIG. 3.

In various implementations, the LVDS signaling method may have the electrical specifications shown in Table 1, although these may be modified in a given application.

TABLE 1

| Parameter | Description | Min | Max | Units |
|---|---|---|---|---|
| $V_{OD}$ | Differential output voltage | 247 | 454 | mV |
| $V_{OS}$ | Offset voltage | 1.125 | 1.375 | V |
| $dV_{OD}$ | |Change to VOD between 0 and 1| | | 50 | |mV| |
| $dV_{OS}$ | |Change to VOS| between 0 and 1| | | 50 | |mV| |
| $t_r/t_f$ | Output rise/fall times | 0.26 | 1.5 | ns |
| $I_{IN}$ | Input current | | 20 | uA |
| $V_{TH}$ | Receive threshold voltage | | +100 | mV |
| $V_{IN}$ | Input voltage range | 0 | 2.4 | V |

The signal swing of the LVDS signals are typically set to ~350 millivolts, peak to peak (mVpp). An adjustment of either the drive current or load resistance may be available to allow the voltage swing to be adjusted. This will allow characterization of bit error rate (BER) vs. Vpp to allow an optimized tradeoff between power (and possibly RF interference) and BER for a particular board level implementation. In one embodiment this swing may be adjusted to be as low as 50 mV, to still meet BER requirements while reducing power consumption. That is, the swing can be adjusted based on error information received from the receiver.

In various embodiments, the data sent across the link is encoded using an 8b/10b line code. This code provides unique characters that are used for rate adaptation and synchronization functions. The unique characters can be identified by the receiver, and separated from the data. To implement this coding scheme, the data samples may be broken up into a sequence of bytes before coding.

An interface in accordance with an embodiment of the present invention may support variable I and Q sample widths. In different implementations samples may be coded into differing bit lengths, e.g., of 6-12 bits, although the scope of the present invention is not limited in this regard. For example, some analog TV systems require more dynamic range and thus more bits are needed, while the digital standards typically have a lower dynamic range requirement. The widths are specified by a control register, namely a word_size [1:0] register. The available bit widths can be specified on both the transmitter and receiver side according to the following Table 2, in one embodiment.

TABLE 2

| word_size[1:0] | number of bits |
|---|---|
| 00 | 6 |
| 01 | 8 |
| 10 | 10 |
| 11 | 12 |

To maximize transmission efficiency, the sample words are reformatted into a sequence of contiguous bytes. That is, although a variable encoding scheme is used to convert analog data into digital samples (e.g., of 6-12 bit widths), embodiments may use a packet structure of a fixed length, which in one embodiment may be 30 words, each having 8 bits. The sequence of bytes thus defines a data "packet". For the 6 bit, 10 bit, and 12 bit word sizes, some bytes will contain parts of two different data samples, so the data packet must be identifiable by the receiver to allow for appropriate reformatting into the original data sample. In one embodiment, the 30 byte-long packet interleaves the I and Q data. For the 6, 8, 10, and 12 bit words, the packets are constructed in accordance with the following Tables 3-6. In various embodiments, a fixed packet size can avoid the need to send packet size type information across the line.

TABLE 3

| $Q_0[1:0]$ | | | $I_0[5:0]$ | | |
| | $I_1[3:0]$ | | | $Q_0[5:2]$ | |
| | | $Q_1[5:0]$ | | | $I_1[5:4]$ |
| $Q_2[1:0]$ | | | $I_2[5:0]$ | | |
| | $I_3[3:0]$ | | | $Q_2[5:2]$ | |
| | | $Q_3[5:0]$ | | | $I_3[5:4]$ |
| $Q_4[1:0]$ | | | $I_4[5:0]$ | | |
| | $I_5[3:0]$ | | | $Q_4[5:2]$ | |
| | | $Q_5[5:0]$ | | | $I_5[5:4]$ |
| $Q_6[1:0]$ | | | $I_6[5:0]$ | | |
| | $I_7[3:0]$ | | | $Q_6[5:2]$ | |
| | | $Q_7[5:0]$ | | | $I_7[5:4]$ |
| $Q_8[1:0]$ | | | $I_8[5:0]$ | | |
| | $I_9[3:0]$ | | | $Q_8[5:2]$ | |
| | | $Q_9[5:0]$ | | | $I_9[5:4]$ |
| $Q_{10}[1:0]$ | | | $I_{10}[5:0]$ | | |
| | $I_{11}[3:0]$ | | | $Q_{10}[5:2]$ | |
| | | $Q_{11}[5:0]$ | | | $I_{11}[5:4]$ |
| $Q_{12}[1:0]$ | | | $I_{12}[5:0]$ | | |
| | $I_{13}[3:0]$ | | | $Q_{12}[5:2]$ | |
| | | $Q_{13}[5:0]$ | | | $I_{13}[5:4]$ |
| $Q_{14}[1:0]$ | | | $I_{14}[5:0]$ | | |
| | $I_{15}[3:0]$ | | | $Q_{14}[5:2]$ | |
| | | $Q_{15}[5:0]$ | | | $I_{15}[5:4]$ |
| $Q_{16}[1:0]$ | | | $I_{16}[5:0]$ | | |
| | $I_{17}[3:0]$ | | | $Q_{16}[5:2]$ | |
| | | $Q_{17}[5:0]$ | | | $I_{17}[5:4]$ |
| $Q_{18}[1:0]$ | | | $I_{18}[5:0]$ | | |
| | $I_{19}[3:0]$ | | | $Q_{18}[5:2]$ | |
| | | $Q_{19}[5:0]$ | | | $I_{19}[5:4]$ |

TABLE 4

$I_0[7:0]$
$Q_0[7:0]$
$I_1[7:0]$
$Q_1[7:0]$
$I_2[7:0]$
$Q_2[7:0]$
$I_3[7:0]$

TABLE 4-continued $Q_3[7:0]$
$I_4[7:0]$
$Q_4[7:0]$
$I_5[7:0]$
$Q_5[7:0]$
$I_6[7:0]$
$Q_6[7:0]$
$I_7[7:0]$
$Q_7[7:0]$
$I_8[7:0]$
$Q_8[7:0]$
$I_9[7:0]$
$Q_9[7:0]$
$I_{10}[7:0]$
$Q_{10}[7:0]$
$I_{11}[7:0]$
$Q_{11}[7:0]$
$I_{12}[7:0]$
$Q_{12}[7:0]$
$I_{13}[7:0]$
$Q_{13}[7:0]$
$I_{14}[7:0]$
$Q_{14}[7:0]$

TABLE 5

$I_0[7:0]$
$Q_0[7:0]$
$I_1[5:0]$     $I_0[9:8]$
$Q_1[5:0]$     $Q_0[9:8]$
$I_2[3:0]$     $I_1[9:6]$
$Q_2[3:0]$     $Q_1[9:6]$
$I_3[1:0]$     $I_2[9:4]$
$Q_3[1:0]$     $Q_2[9:4]$
$I_3[9:2]$
$Q_3[9:2]$
$I_4[7:0]$
$Q_4[7:0]$
$I_5[5:0]$     $I_4[9:8]$
$Q_5[5:0]$     $Q_4[9:8]$
$I_6[3:0]$     $I_5[9:6]$
$Q_6[3:0]$     $Q_5[9:6]$
$I_7[1:0]$     $I_6[9:4]$
$Q_7[1:0]$     $Q_6[9:4]$
$I_7[9:2]$
$Q_7[9:2]$
$I_8[7:0]$
$Q_8[7:0]$
$I_9[5:0]$     $I_8[9:8]$
$Q_9[5:0]$     $Q_8[9:8]$
$I_{10}[3:0]$     $I_9[9:6]$
$Q_{10}[3:0]$     $Q_9[9:6]$
$I_{11}[1:0]$     $I_{10}[9:4]$
$Q_{11}[1:0]$     $Q_{10}[9:4]$
$I_{11}[9:2]$
$Q_{11}[9:2]$

TABLE 6

$I_0[7:0]$
$Q_0[7:0]$
$I_1[3:0]$     $I_0[11:8]$
$Q_1[3:0]$     $Q_0[11:8]$
$I_1[11:4]$
$Q_1[11:4]$
$I_2[7:0]$
$Q_2[7:0]$
$I_3[3:0]$     $I_2[11:8]$
$Q_3[3:0]$     $Q_2[11:8]$
$I_3[11:4]$
$Q_3[11:4]$
$I_4[7:0]$
$Q_4[7:0]$
$I_5[3:0]$     $I_4[11:8]$
$Q_5[3:0]$     $Q_4[11:8]$

TABLE 6-continued $I_5[11:4]$
$Q_5[11:4]$
$I_6[7:0]$
$Q_6[7:0]$
$I_7[3:0]$     $I_6[11:8]$
$Q_7[3:0]$     $Q_6[11:8]$
$I_7[11:4]$
$Q_7[11:4]$
$I_8[7:0]$
$Q_8[7:0]$
$I_9[3:0]$     $I_8[11:8]$
$Q_9[3:0]$     $Q_8[11:8]$
$I_9[11:4]$
$Q_9[11:4]$ Further, embodiments also provide an ability to at least monitor the quality of the communication between the two chips, with error detection and built-in-testing, which can be used to adjust the clock phasing or frequency of synchronization transmissions. That is, the weight of a synchronizing code word V, which is sent with every frame can be adjusted. By controlling the weight of synchronization, transmission overload can be reduced. For example the more robust a link, the less synchronization is needed, and vice versa.

Each packet thus delineates the time when a synchronization pattern can be sent. Two types of synchronization patterns may be used: 1) data frame synchronization; and 2) scrambler frame synchronization. Data frame synchronization is used by the receiver to determine the 10-bit word boundary, synchronize the transmitter and receiver disparities, and to synchronize to the packet boundary. Scrambler frame synchronization is used by the receiver to determine the 10-bit word boundary, synchronize the transmitter and receiver disparities, synchronize to the packet boundary, and synchronize the receiver's descrambler to the transmitter's scrambler.

The data frame length (in packets) is specified in the transmitter by a control register, e.g., a data_frame_rate[7:0] register. The values 1 to 255 specify from 1 to 255 packets per data frame. The value 0 is used to allow for an infinite length frame. Similarly, the scrambler frame length is specified in the transmitter by the scrambler_frame_rate[7:0] register. The two frame lengths can be independently specified. If a scrambler frame coincides with a data frame, a scrambler frame pattern is sent.

Each frame pattern includes two 8b/10b control words. The data frame uses a predetermined control pattern, repeated twice, which in one embodiment may be a K28.5 pattern. The scrambler frame may use two different predetermined control patterns, e.g., a K28.5 pattern followed by a K28.1 pattern.

During transmission of a data packet, there may be times when there is no new data to be sent. At these times, the transmitter can insert stuffing bytes until new data is available. In one embodiment, the stuffing byte may correspond to a predetermined control pattern, e.g., the K23.7 pattern, which can be identified by the receiver, and removed from the data stream before it is output to the demodulator.

Figure 4:
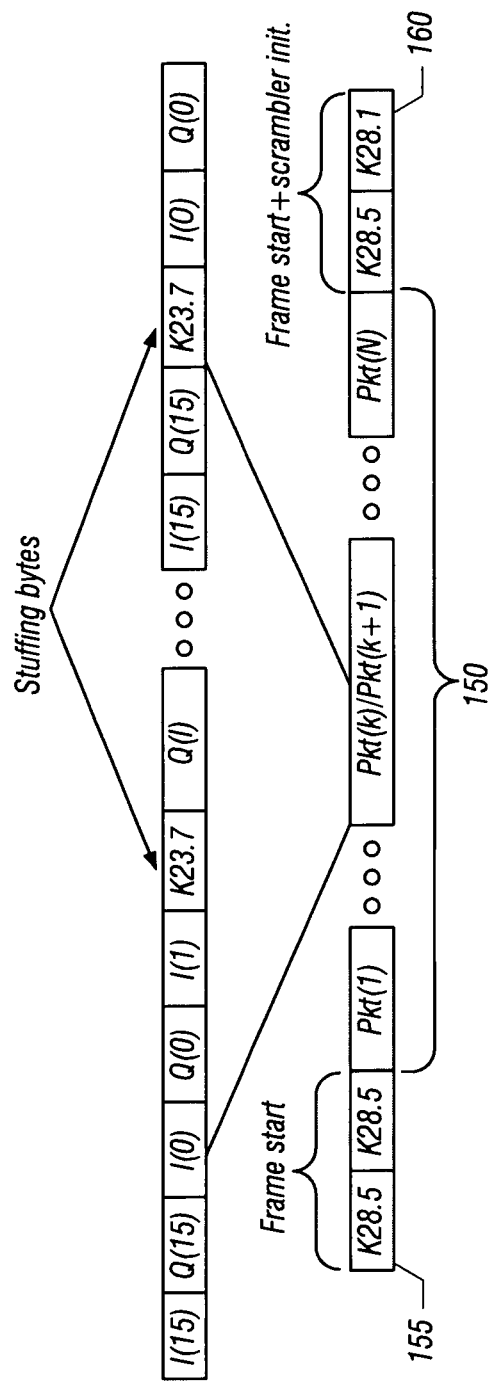
FIG. 4 is a timing diagram of packet transmission in accordance with one embodiment of the present invention.

Thus shown in FIG. 4 is a timing diagram of packet transmission in accordance with one embodiment of the present invention. As shown in FIG. 4, multiple data packets 150, each having 30 bytes of I and Q interleaved data samples are sent between a first frame pattern 155 that includes a pair of two consecutive identical patterns (K28.5 as shown in the embodiment of FIG. 4) followed by N number of data packets. FIG. 4 also shows a close-up of a portion of a data packet in which a stuffing byte having a value of K23.7 (in the embodiment of FIG. 4) is provided in between two bytes of the data samples. Note that FIG. 4 also shows a different synchronization frame pattern 160, namely a scrambler frame synchronization pattern sent at the end of the data frame to indicate the beginning of the next data frame. Specifically, as shown in FIG. 4 the scrambler frame synchronization pattern 160 includes two consecutive, patterns having different values, for example the K28.5 and K28.1 patterns shown in FIG. 4. While shown with this particular example in the embodiment of FIG. 4, the scope of the present invention is not limited in this regard.

The SDI clock must be fast enough to accommodate the overhead associated with 8b/10b coding, and the synchronization protocol. This can be described by the following equation:

$$f_{SDI} \geq 2 * f_T * (10/8) * N_b * (1 + N_s/N_d) \quad [\text{EQ. 1}]$$

where $f_{SDI}$ is the serial digital interface clock frequency, the factor of 2 accounts for I and Q samples to represent the complex data, $f_T$ is the tuner data clock frequency, the 10/8 factor is due to the 8b/10b encoding, the $N_b$ value is the number of bits per sample for I or Q, and the $N_s/N_d$ term represents the overhead of the synchronization bytes to data bytes. In many cases, the SDI clock frequency will be constrained in the possible frequency selections, and it will be greater than required. To accommodate a greater frequency than required, stuffing bytes can be added to the transmitted data stream to ensure uninterrupted bit transmission.

In some implementations, the maximum sample rate for I and Q data is expected to be 13.5 MHz. Using Equation 1 for $f_{SDI}$ with the maximum frame rate (every 30 bytes) and largest word size (12 bits), the serial bit rate (and clock frequency) is 432 MHz.

The SDI logical interface is enabled on the transmitter side by the assertion of several enable signals. Similarly, the SDI logical interface is enabled on the receiver side by the assertion of such enable signals. When each of these signals is 0, the respective interfaces are held in an initial state. Once the transmitter enable is asserted, the transmission of encoded data will commence. Once the receiver enable is asserted, the receiver will begin the process of synchronization by searching for a data or scrambler frame synchronization pattern. During this time, arbitrary data is output from the receiver.

Figure 6:
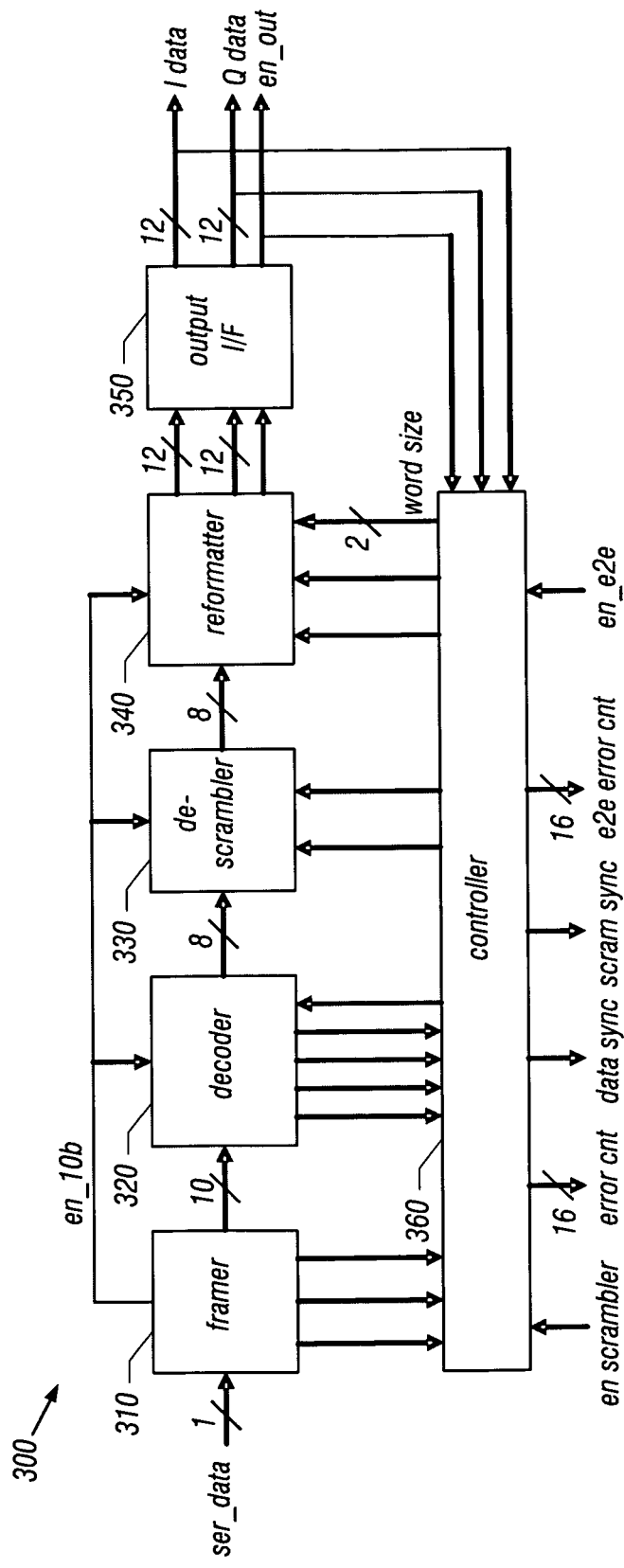
FIG. 6 is a block diagram of a serial digital interface for a receiver in accordance with an embodiment of the present invention.

When a valid data or scrambler frame synchronization pattern is seen by the receiver, the data_sync or scrambler sync bits will be asserted from a controller of SDI 110, and which are discussed further with reference to FIG. 6. Once set, these bits will remain set until the rcvr_enable signal is set to 0.

Figure 5:
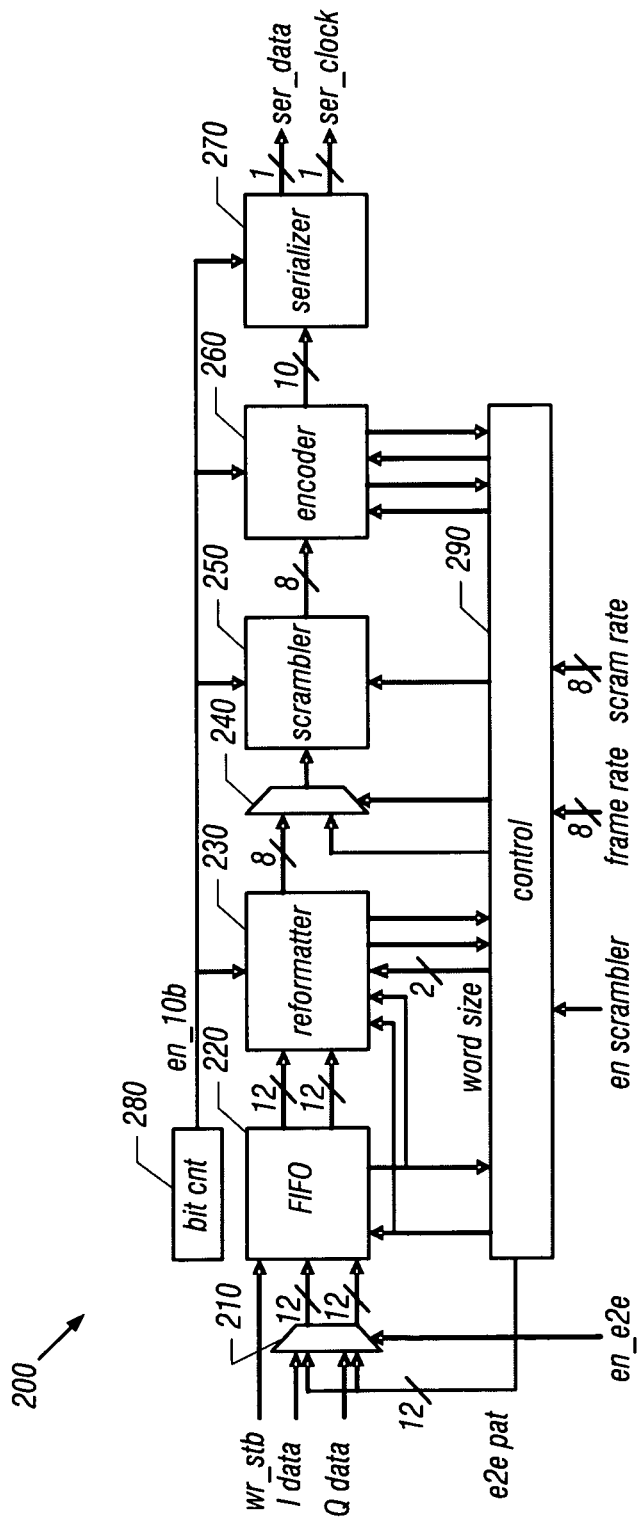
FIG. 5 is a block diagram of a serial digital interface for a transmitter in accordance with one embodiment of the present invention.

Referring now to FIG. 5, shown is a block diagram of a serial digital interface for a transmitter in accordance with one embodiment of the present invention. As shown in FIG. 5, SDI 200 includes a data path having an input multiplexer (MUX) 210, that in turn is coupled to a FIFO 220. The data path continues through a reformatter 230, a multiplexer 240, a scrambler 250, an encoder 260, and finally to a serializer 270, which takes the incoming parallel data and converts it to a serial bit stream, ser_data, for output. Serializer 270 also has a second output corresponding to the clock signal, ser_clock. Note that SDI 200 further includes a controller 290 and a bit counter 280 that can control the various resources of the data path based on control and status signals received from outside of SDI 200, as well as the various data path components themselves.

Still referring to FIG. 5, MUX 210 is coupled to receive incoming I and Q samples. Furthermore, MUX 210 is further coupled to receive test inputs, namely an end-to-end test pattern from controller 290. Based on a built-in test mode enable signal, en_e2e, MUX 210 will output incoming sample data or the test data. Note that the incoming data to MUX 210 is parallel digital data that may be up to twelve bits in width (i.e., for 12 bit encoding of I/Q sample data). However, this width may vary depending on the encoding selected, and may be as small as 6 bits.

The data output from multiplexer 210 is provided to a FIFO 220, where the data is written under control of a write strobe signal (wr_stb), which may be received from a channel select filter, e.g., associated with demodulator 20 of FIG. 1. FIFO 220 acts to adapt the tuner data rate to the SDI rate. That is, FIFO 220 is used to adapt the weight between selected sampling and clock rates. The I and Q data samples are input and output in parallel as 12 bit values each. The write strobe is used to synchronously latch the data into a FIFO register selected by a write pointer. Data to be read is selected by a read pointer. The size of FIFO 220 may be dependent on the maximum burst rate and duration of data from the tuner, and the maximum delay between reads by the transmitter.

Referring still to FIG. 5, re-formatter 230 is coupled to FIFO 220. Re-formatter 230 maps the 6, 8, 10, or 12 bit I/Q data samples into bytes, and keeps track of the number of bytes output, and indicates the end of a packet to controller 290 after 30 bytes. Re-formatter 230 thus provides byte-width outputs to a multiplexer 240, which is controlled under control of controller 290 to output either reformatted data, or control patterns to a scrambler 250. Scrambler 250 may operate to randomize the data before 8b/10b encoding when enabled under control of controller 290 to reduce the probability of the repetitive patterns in the data stream. A bypass allows the scrambler to be disabled when scrambling is not required. The bypass is also used when control characters are being sent. In one embodiment, scrambler 250 uses a length 15 linear feedback shift register (LFSR) that implements the generator function: $G(x)=1+x^{14}+x^{15}$. The seed value is: 15'b000000010101001. Scrambler 250 may be re-initialized at the start of each scrambler frame. The scrambled (or non-scrambled) output from scrambler 250 is provided to encoder 260, which may be, as discussed above, an 8b/10b encoder. Encoder 260 thus implements a code that transforms an 8 bit input byte into a 10 bit code word. The code allows for control characters to be encoded that are distinguishable from data code words. The control signal k_in from controller 290 is used to indicate that a byte will be encoded as a control word.

Accordingly, 10 bit parallel data is provided to serializer 270, which serializes this information into a serial bit stream and also outputs the serial data clock. More specifically, serializer 270 performs the parallel-to-serial conversion of the 10 bit words, and also outputs an inverted version of the clock as the serial clock signal.

Various components in transmitter 200 may be activated under control of bit counter 280, which outputs an enable signal, en_10b. Bit counter 280 is a divide-by-10 counter that generates the 10-bit coded word alignment. When the xmtr_enable bit is asserted, bit counter 280 counts from 0 to 9, and asserts a word enable that is used by many of the transmitter data path blocks to enable processing of the data.

Note that controller 290 can receive various incoming signals including a scrambler enable signal, and information regarding frame rate and scrambling rate, among other such information. Furthermore, while not shown in the block diagram of FIG. 5, understand that a clock controller may be present within controller 290, or elsewhere within SDI 200 to receive an incoming clock signal, e.g., the tuner clock at which a remainder of the tuner operates, and generate an interface clock that is used to clock the various components of SDI 200 which may be at a different frequency than other digital clocks of the tuner, as will be described further below. Such controller may further generate the serial clock that is to be transmitted across the link. While shown with this particular implementation in the embodiment of FIG. 5, the scope of the present invention is not limited in this regard.

Referring now to FIG. 6, shown is a block diagram of a serial digital interface for a receiver such as a demodulator, in accordance with an embodiment of the present invention. As shown in FIG. 6, SDI 300 is coupled to receive the incoming serial bit stream as ser_data, which is provided to a data path that includes a framer 310, a decoder 320, a de-scrambler 330, and a reformatter 340, which provides reformatted data, i.e., having the same bit width as the original I/Q data samples of a transmit side, to an output interface 350 that forwards this data to other circuitry of a receiver, such as demodulator circuitry. This data path may operate under control of a controller 360, which receives various control and status signals and controls the different components of the data path accordingly.

As seen in FIG. 6, incoming serial bit stream is provided to framer 310 that acts to detect the synchronization patterns to determine the appropriate bit boundary for the 10 bit words. When a data frame or scrambler frame synchronization pattern is seen, an indicator is output to allow synchronization of the receiver. The synchronization includes the 10b/8b decoder disparity, scrambler initialization, and re-formatter initialization.

When the receiver is enabled, framer 310 begins to search for the data frame synchronization pattern (in one embodiment encoded as a K28.5 pattern). Upon detection of the first sync pattern, a counter is loaded with the current bit count value. This value is considered to be the possible alignment for the 10-bit words. When the bit counter rolls over to the possible alignment count value again, the input bit sequence is examined to see if it matches either a data frame sync pattern, or a scrambler sync pattern (in one embodiment encoded as a K28.1 pattern). If a synchronization pattern is seen, the bit counter is reset to 0 to set the 10 bit word alignment. If a sync pattern is not seen, the bit counter is not reset, and continues to run freely. In either case (sync or not), framer 310 returns to the search state to look for the next synchronization pattern. Accordingly, framer 310 outputs parallel data, namely a 10-bit-wide parallel data to decoder 320, which may be an 8b/10b decoder that acts to convert the 10-bit-wide coded values back into the encoded bytes. The disparity of decoder 320 is initialized by framer 310 when it detects the synchronization pattern. Code errors or disparity errors can be detected, and indicated to controller 360 to allow counting of the errors. Decoder 320 distinguishes code and control words, and provides an indication of control values on an output signal, k_out. The k_out signal may be used by de-scrambler 330 and re-formatter 340 to separate the control bytes from the data bytes.

Referring still to FIG. 6, the decoded data is provided from decoder 320 to de-scrambler 330 that operates to remove the randomization of the data introduced in the transmitter. A bypass allows de-scrambler 330 to be disabled when de-scrambling is not required. The bypass is also used when control characters are received. Control characters are not de-scrambled, and do not advance the de-scrambler sequence. In one embodiment, de-scrambler 330 uses a length 15 LFSR that implements the generator function: $G(x)=1+x^{14}+x^{15}$. The seed value is: 15'b000000010101001. De-scrambler 330 may be re-initialized at the start of each scrambler frame.

In turn, de-scrambler 330 is coupled to re-formatter 340 that reformats the de-scrambled bytes to the appropriate format, e.g., based on the word size of the coding of the underlying I/Q samples. Accordingly, re-formatter 340 operates to map the bytes into 6, 8, 10, or 12 bit I/Q data samples. The k_char input signal from controller 360 is used by re-formatter 340 to distinguish data from control bytes. Data bytes are counted to perform the mapping function. A frame or scrambler synchronization signal re-initializes the re-formatter byte counter to maintain appropriate alignment to the transmitter. The least significant bits (LSBs) for 6, 8 and 10 bit words are set to zeros before I and Q data is output as 12 bit words.

Referring still to FIG. 6, re-formatter 340 is coupled to output interface 350 that operates to provide a new data indicator to the demodulator one clock cycle before outputting new I and Q data. This interface provides no smoothing or rate adaptation, as it is assumed that the demodulator can accept the bursty nature of the data stream.

As shown in FIG. 6, controller 360 receives incoming enable signals, including an enable signal for end-to-end testing, en_e2e, and a scramble enable signal, en_scrambler. Furthermore, controller 360 outputs error count information, including error count information regarding normal data samples, as well as error count information regarding built in test errors. If a receiver determines that bit error rate is occurring, a phase of the transmitted clock can be adjusted. For example, downstream receiver circuitry such as forward error correction (FEC) circuitry, e.g., a microcontroller, may determine that a high error rate is occurring. As a result, the receiver will transmit a control signal, e.g., via a I²C path back to the transmit side, to adjust its clock. Still further, controller 360 outputs the data sync and scramble sync signals. While shown with this particular implementation in the embodiment of FIG. 6, the scope of the present invention is not limited in this regard.

Errors may occur that corrupt the data sent across the serial interface. The data corruption may occur randomly, or may be caused by a systematic mechanism. It is expected that randomly occurring errors will occur with extremely low probability, so no error correction capability is provided with the protocol. If a random error occurs in a data byte, the demodulator FEC should be able to correct it. However, if a random error occurs in the control words (e.g., sync and stuffing), this has the potential to corrupt a large number of samples. Since the sync patterns can be detected with any bit alignment, 2 consecutive control patterns are used to reduce the probability of false detection. Stuffing patterns only use one control pattern, but will only be detected with appropriate word alignment, so the probability of false detection is reduced. Some consideration of the frame size versus the overhead required may be made when the link BER is known, to optimize the overall performance. Thus embodiments may dynamically update data frame length based on error rates.

Systematic errors may occur if the receiver clock/data timing relationship is not appropriate. In this case, the receiver may fail to synchronize, or a large number of errors may be seen because of improper sampling of the data.

The 8b/10b coding scheme provides some error detection capability. Of the 1024 possible 10 bit values, only 536 are valid code words (data or control). An invalid code word can be detected if it is not one of the 536 valid code words. In addition, each of the code words represents one of two possible representations for the 8 bit data or control value. A running disparity is kept by the receiver, and a code word with incorrect disparity can be flagged. The combination of code errors and disparity errors can be used to monitor the quality of the link.

An error monitor can be enabled by asserting an error detection signal within SDI 300, e.g., an en_err_detect signal.

The rising edge of this signal will reset a control register, e.g., an err_cnt[15:0] register in counter 360. When the en_err_detect bit is asserted, the count of errors will be reported by the err_cnt register. This value may saturate at 16'hffff.

The error monitor can be used to select the appropriate clock/data relationship on the transmitter. The transmitter will provide control of the launch clock edge with the xmtr_clk_edge bit. Additional control of the timing relationship is available using the xmtr_clk_delay bit to insert a ¼ clock cycle delay in the clock output path. These 2 bits provide 4 possible clock/data timing relationships, as described above with regard to FIG. 3.

A built-in test mode can be provided to allow end-to-end testing of the transmitter and receiver. A linear feedback shift register in the transmitter is used to generate the transmitted and expected receive patterns. The receiver LFSR is synchronized to the incoming data before error measurement is enabled. On the receive side, the error monitor will indicate an error if any bit of the received I or Q sample is in error. The error count can be enabled by asserting the en_e2e_test bit, and recorded by the e2e_test_err_cnt[15:0] register in controller 360. The rising edge of en_e2e_test will clear the e2e_test_err_cnt register. The e2e_test_err_cnt register may saturate at 16'hffff.

Figure 7:
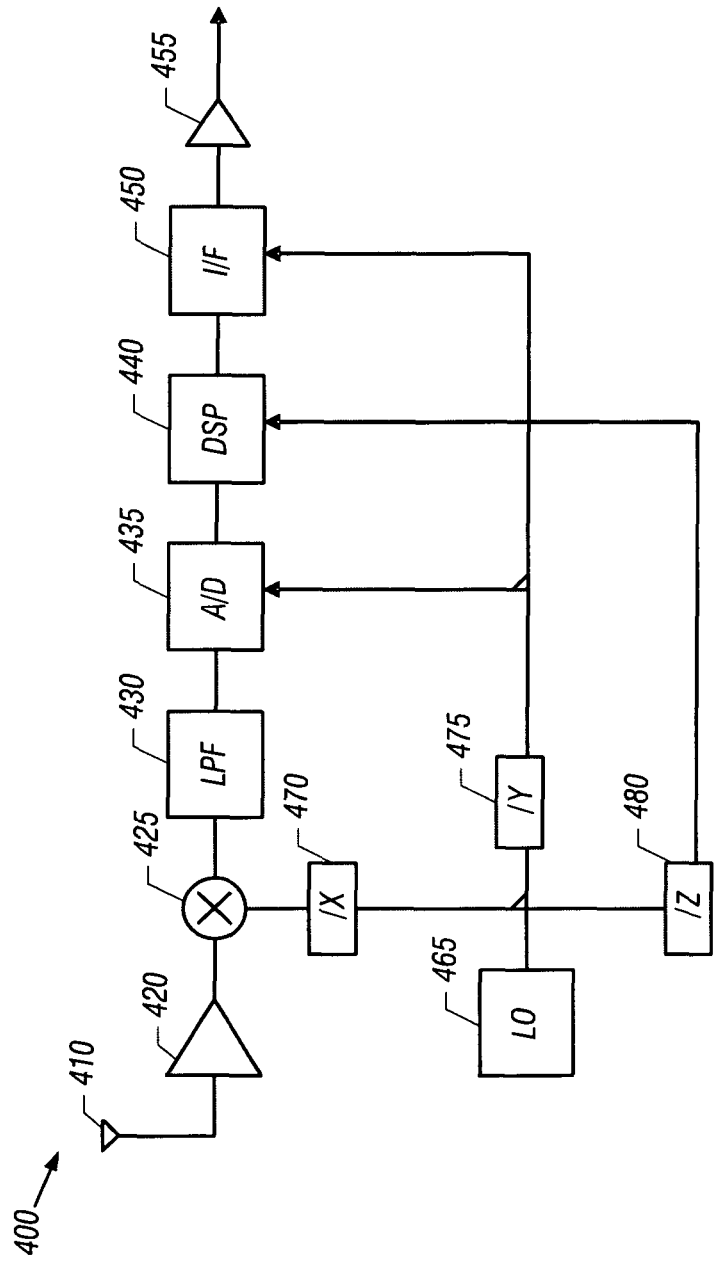
FIG. 7 is a block diagram of a portion of a system in accordance with an embodiment of the present invention.

As described above, in some implementations the need for an analog interface to convert digitized information into analog form for transmission from a tuner can be avoided, reducing size, complexity and power consumption. Referring now to FIG. 7, shown is a block diagram of a tuner in accordance with one embodiment of the present invention. As shown in FIG. 7, tuner 400 may provide only a digital interface to downstream circuitry.

Tuner 400 may be coupled to a source of RF signals, e.g., an antenna 410 that is coupled to a low noise amplifier 420, which in turn is coupled to a mixer 425 that operates to downconvert the RF signals to IF or baseband signals. As further shown in FIG. 7, mixer 425 is further coupled to receive a clock signal from a local oscillator (LO) 465. More specifically, LO 465, which may be part of a clock controller, generates an LO frequency that can be provided to multiple frequency dividers. In the embodiment of FIG. 7, three such frequency dividers 470, 475 and 480 are shown. Thus the LO frequency as divided by frequency divider 470 is provided to mixer 425 for mixing with the incoming RF signal.

The downconverted signal from mixer 425 is provided to a low pass filter (LPF) 430, which in turn is provided to an A/D converter 435. Note that A/D converter 435 may be clocked by a different clock value, also derived from LO 465 through a frequency divider 475. After being digitized, sample data is provided to a digital signal processor (DSP) 440, which may perform various tuning and other processing operations in the digital domain. Note that DSP 440 is clocked by yet a different clock frequency, also derived from LO 465 through frequency divider 480. From DSP 440, processed samples are provided to an interface 450, which may be a digital interface such as described above with reference to FIG. 5. Then the serial bit stream may be buffered in buffer 455 and output on a output line or other conductor which may take the form of a differential conductor, in some embodiments.

Note that the clock frequencies used by A/D converter 435, DSP 440 and interface 450 may be managed to reduce spur effects, such as direct co-channel spurs coupling into the analog front end including LNA 420, and avoiding reciprocal mixing, such as coupling into mixer 425. Thus, at least the clock frequency of digital interface 450 (and A/D converter 435) may be adjusted by a clock controller to reduce spur effects. Furthermore, interface 450 may operate to transform a continuous data stream that is received at one rate (e.g., 200 megabits per second (mbps)) into an isochronous data stream at a second rate (e.g., greater than 250 mbps) by adding packet delimiters, such as the sync patterns and idle patterns discussed above. In this way, DSP 440 and interface 450 (and A/D converter 435) may have a clock relationship that varies without disrupting the data link to a receiver. Instead, as discussed above the receiver can maintain synchronization to the incoming data stream by the communication protocol discussed above.

In systems implementing a digital interface between tuner and demodulator, the demodulator can also be designed without corresponding analog interface circuitry to convert incoming analog signals to digital form. In this way, greater functionality may be adapted on a single semiconductor die including such a demodulator. For example, a demodulator, FEC circuitry, along with other decoding circuitry and a host processor, all may be adapted on a single semiconductor die.

In various embodiments, to reduce the amount of pins needed for communication of control information, as well as the clock and data signaling described above, a variable impedance method may be used to provide control signaling between the devices. For example, a receiver can be made to be a master of the transmitter by modulating an amplitude of the signaling on the receiver side, for example, by varying an impedance coupled to the input lines on the receiver side such as by varying a termination resistance coupled to the lines to thus send control commands back to the transmitter. In some embodiments, only a single differential line pair may be present to do all clock, data and control signaling. In such an embodiment, an LVDS signaling mechanism may be provided with a variable impedance on the load side to initiate signaling as a master. On the forward side, one or more additional control characters of a communication protocol such as additional 8b/10b control characters, can be used to send information, such as control information. For example a first 8b/10b control character can be used to denote a logic high and a second control character can be used to denote a logic low. Combinations of such control characters can thus be used to transmit control information from transmitter to receiver. Embodiments can thus use different types of stuffing bytes, or similar characters, to indicate like a start of a method or other such control information.

In this way, a sideband communication channel such as an I²C channel can be replaced. By adjusting impedance on the master side, the differential line on the forward side can sense this change and decode it into a start of message or other such signal. Then responsive to this signal, the tuner may provide information, such as reading a register or writing a register.

Figure 8:
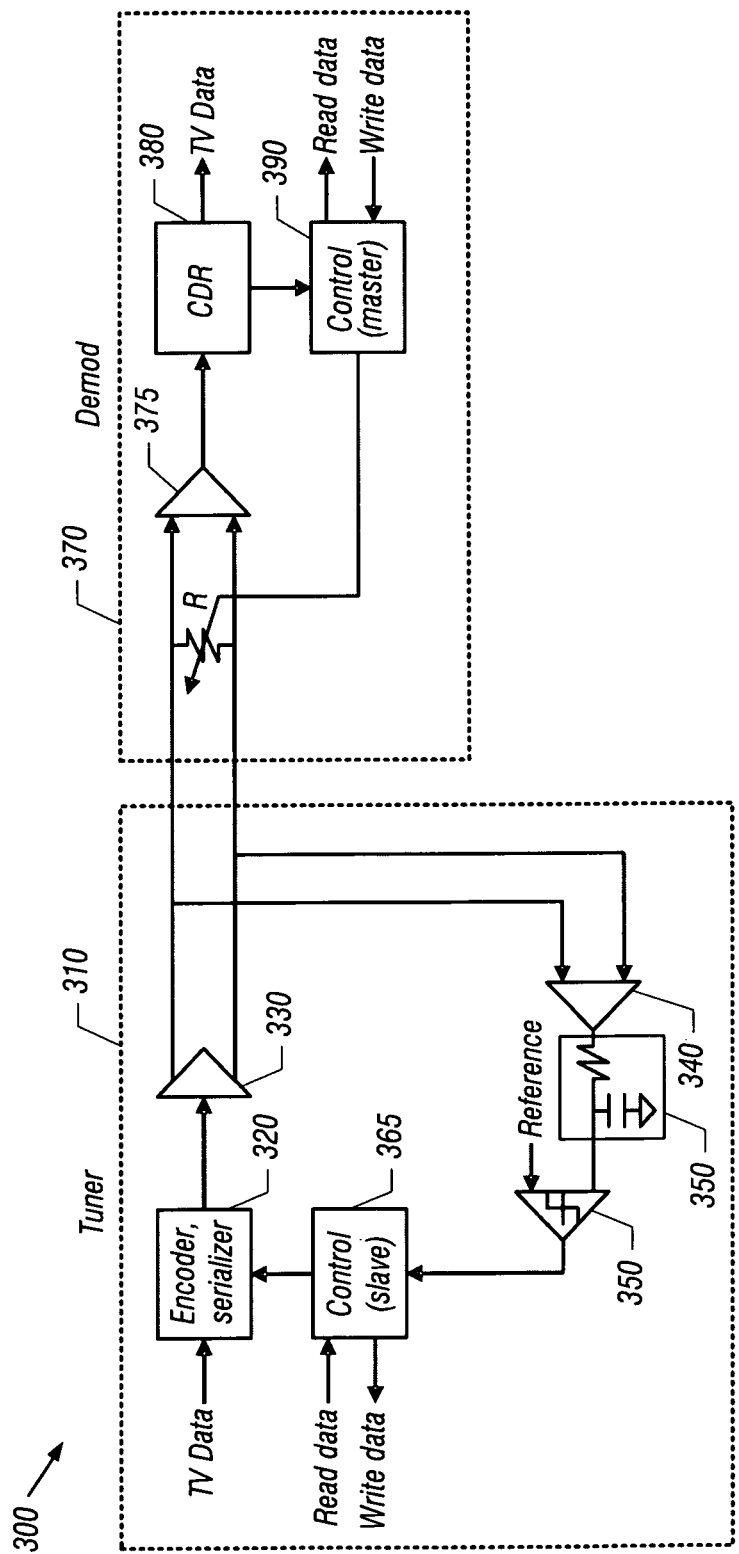
FIG. 8 is a block diagram of a portion of a system in accordance with another embodiment of the present invention.

Referring now to FIG. 8, shown is a block diagram of a portion of a system in accordance with such an embodiment. Specifically, FIG. 8 shows a system 300 that includes a tuner 310 and a demodulator 370. Tuner 310 includes an encoder 320 that receives incoming TV data and acts to serialize it into a serial bit stream to be transmitted through a buffer 330 and then across a link, for example, as a LVDS signal. Demodulator 370 in turn receives incoming LVDS signals at a buffer 375, which provides the signals to a clock and data recovery (CDR) circuit 380. Furthermore, a control circuit 390 is present in demodulator 370 to receive information from CDR 380 and can act as a master to perform, e.g., write and read operations. To provide control signals such as to request information from tuner 310, control circuit 390 may cause a change in the impedance (for example a variable termination impedance, R) that is coupled between the LVDS lines.

In turn, this causes a change in a voltage detected by a voltage detector 340 on tuner 310, which in turn is coupled to a low pass filter 350, e.g., formed of a RC network. The output of LPF 350 is provided to a comparator 360, where the voltage is compared to a reference voltage. Thus this impedance change in demodulator 370 may cause a control signal to a control circuitry 365, which may act as a slave and perform read and write operations responsive to this impedance change. While shown with this particular implementation in the embodiment of FIG. 8, the scope of the present invention is not limited in this regard.

Figure 9:
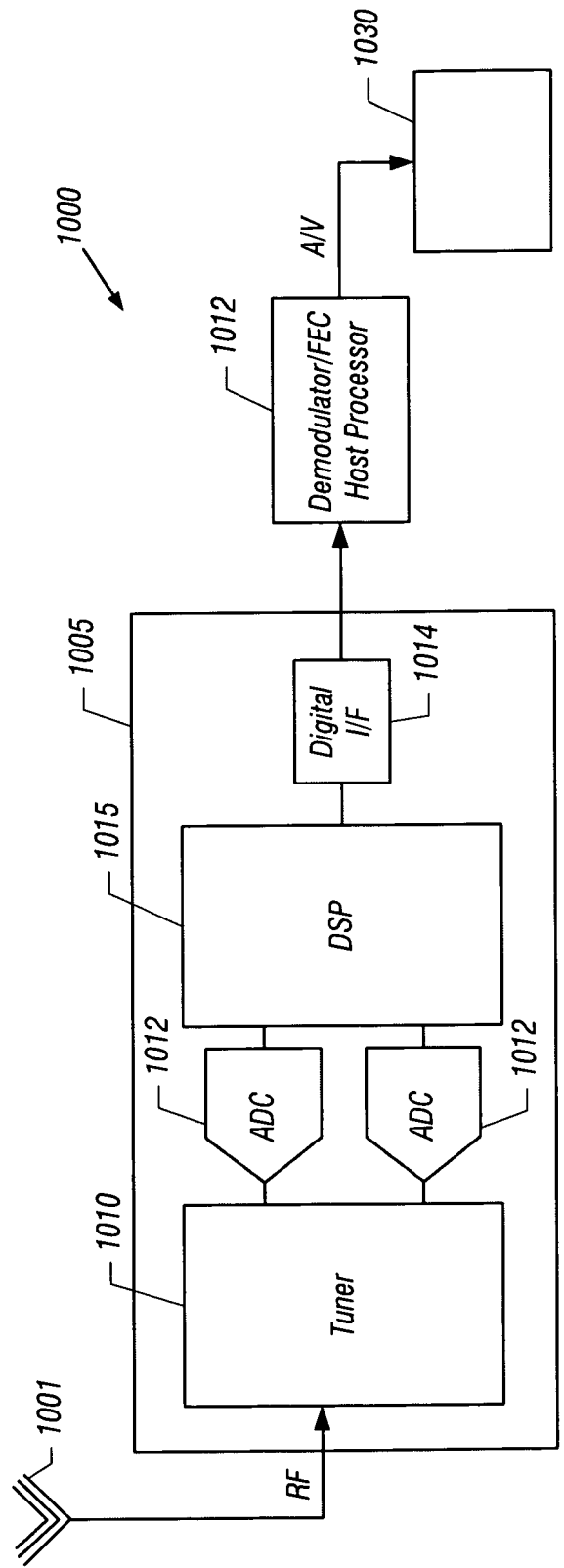
FIG. 9 is a block diagram of a system in accordance with one embodiment of the present invention.

Embodiments may be implemented in many different system types, such as set-top boxes, high definition or standard digital terrestrial televisions, and so forth. Some applications may be implemented in a mixed signal circuit that includes both analog and digital circuitry. Referring now to FIG. 9, shown is a block diagram of a system in accordance with one embodiment of the present invention. As shown in FIG. 9, system 1000 may include a television that is coupled to receive a RF signal from an antenna source 1001 such as an over-the-air antenna 1001. However, in other embodiments the original source may be cable distribution, satellite, or other source that is then redistributed through a digital terrestrial network. The incoming RF signal may be provided to a front end device 1005 which may be, in one embodiment a single-chip mixed signal device. Front end device 1005 may incorporate embodiments of the present invention to provide a digital interface.

Referring still to FIG. 9, front end device 1005 may include a tuner 1010. More specifically, the incoming RF signal is provided to a tuner 1010 for tuning to a desired signal channel. While the scope of the present invention is not limited in this regard, tuner 1010 may include various circuitry. For example, in one embodiment tuner 1010 may include a bandpass filter having an output coupled to a LNA to receive and amplify the RF signal. The output of the LNA may be provided to another bandpass filter that in turn is coupled to a mixer. In turn, the mixer downconverts the incoming RF signal to a complex IF output, which may be digitized by an analog-to-digital converters (ADCs) 1012, to provide a desired signal channel. The signal channel may be a digitized signal the channel may be provided to a DSP 1015 which can perform various digital-based processing operations, and provide digitized samples to a digital interface 1014 for output along an output path.

Referring still to FIG. 9, the digital output path may be coupled to a processor 1020, which includes various functionality. For example, processor 1020 may include a line demodulator and FEC circuitry to generate a transport stream such as an MPEG transport system that is provided to a host of processor 1020 for further processing into an audio visual signal that may be provided to a display 1030, such as a computer monitor, flat panel display or other such display. Note further, in the embodiment of FIG. 9 there is no need for a control channel (e.g., an I²C channel) between host processor 1020 and front end device 1005, using the variable impedance scheme described above in FIG. 8.

While shown with this particular implementation in the embodiment of FIG. 9, it is to be understood the scope of the present invention is not limited in this regard. Furthermore, it is to be understood that embodiments may be implemented in many different devices, such as receivers, transmitters and so forth. Still further, control logic, program storage or other computer readable media may be present to store instructions that when executed enable the digitized transmission of data at a varying clock rate, varying synchronization rate, and variable sample rate per packet.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   an analog front end to receive incoming radio frequency (RF) signals including television data and convert the incoming RF signals to baseband digital signals;
   a digital unit coupled to the analog front end to receive the baseband digital signals and to process the baseband digital signals;
   an analog interface to receive the processed baseband digital signals and to convert the processed baseband digital signals into analog signals;
   a first pin coupled to the analog interface to output the analog signals on a link coupled between the apparatus and a second component; and
   a digital interface to receive the processed baseband digital signals and to convert the processed baseband digital signals into a serial bit stream, the digital interface coupled to the first pin to output the serial bit stream on the first pin, when enabled, wherein the serial bit stream is to be transmitted along the link as a differential signal having a swing controllable based on error information received from the second component.

2. The apparatus of claim 1, wherein the digital interface is to further generate a clock signal, and the digital interface is coupled to a second pin to output the clock signal on the link coupled between the apparatus and the second component, when enabled, the clock signal independent of a second clock signal at which the digital unit operates.

3. The apparatus of claim 2, wherein a frequency of the clock signal is dynamically changeable to avoid interference between a harmonic of the clock signal and circuitry of the analog front end, wherein the analog front end and the digital interface are formed on a single semiconductor die.

4. The apparatus of claim 2, further comprising a controller to adjust a phase of the clock signal responsive to error information received from the second component.

5. The apparatus of claim 1, wherein the analog interface is to be disabled when the digital interface is enabled.

6. The apparatus of claim 1, wherein the processed baseband digital signals comprise digitized analog television demodulated signals, and the apparatus comprises a mixed signal television tuner and the second component comprises a demodulator and host processor, wherein the second component does not include analog circuitry to receive analog signals.

7. The apparatus of claim 1, wherein the digital interface is configured to receive the processed baseband digital signals including data samples having varying bit widths and reformat the processed baseband digital signals into a packet of a fixed size, wherein the packet includes a varying number of the digital samples based on the bit width.

8. The apparatus of claim 7, wherein the digital interface is configured to dynamically change a frequency of frame synchronization transmission sent between data frames formed of a plurality of packets of the fixed size based on feedback information from the second component.

9. The apparatus of claim 7, wherein the digital interface comprises:
   a first-in-first-out (FIFO) buffer;
   a re-formatter coupled to the FIFO buffer to reformat the data samples to a predetermined bit width;
   a scrambler coupled to the re-formatter to scramble the reformatted data samples;

an encoder coupled to the scrambler to encode the scrambled data samples; and a serializer to serialize the encoded data samples and to output the serial bit stream to the first pin.

10. The apparatus of claim 9, wherein each of the reformatted data samples includes a single data sample if the data samples are a first bit width and each of the reformatted data samples includes at least a portion of two different data samples if the data samples are a second bit width, wherein the first bit width is equal to the predetermined bit width.

11. A method comprising:

receiving, in a digital interface of a transmitter, data samples having one of a plurality of bit widths and a control signal to indicate which of the bit widths to which the data samples correspond;

packing the data samples into a packet having a fixed size, wherein the packet includes a first number of the data samples if the bit width is a first bit width and instead includes a second number of the data samples if the bit width is a second bit width, the first number less than the second number, wherein the first bit width is greater than the second bit width;

transmitting the packet from the transmitter as a serial bit stream; and transmitting a clock signal synchronously with the serial bit stream, wherein the clock signal is asynchronous with a second clock signal at which the transmitter operates and dynamically adjusting a frequency of the clock signal to avoid interference with analog circuitry of the transmitter.

12. The method of claim 11, further comprising disabling an analog interface of the transmitter when the digital interface is enabled.

13. The method of claim 11, further comprising transmitting a frame pattern with a plurality of packets, wherein a frequency of the frame pattern is dynamically changeable based on feedback information from a receiver of the serial bit stream.

14. The method of claim 11, further comprising inserting a predetermined pattern into the packet if no data samples are available.

15. A system comprising:

a television tuner including an analog front end to receive incoming radio frequency (RF) signals and convert the incoming RF signals to digital signals, a digital unit coupled to the analog front end to receive the digital signals and to process the digital signals, the digital unit to operate at a first clock frequency that is dynamically controlled to avoid interference with the analog front end, and a digital interface to receive the processed digital signals and to convert the processed digital signals into a serial bit stream to be transmitted from the television tuner at a second frequency, wherein the digital interface is to operate at the second frequency, the second frequency asynchronous with the first clock frequency; and a demodulator coupled to the television tuner by a link, the demodulator including a digital interface to receive the serial bit stream and process the serial bit stream to obtain the digital signals.

16. The system of claim 15, further comprising:

an analog interface to receive the processed digital signals and to convert the processed digital signals into analog signals, wherein the analog interface is disabled if the digital interface is enabled; and a controller to enable one and disable the other of the analog interface and the digital interface.

17. The system of claim 15, wherein the digital interface is to further generate a clock signal at the second frequency, and the digital interface is coupled to a first pin to output the serial bit stream across the link and to a second pin to output the clock signal across the link.

18. The system of claim 15, wherein the digital interface is configured to receive the processed digital signals including data samples having varying bit widths and reformat the processed digital signals into a packet of a fixed size, wherein the packet includes a varying number of the digital samples based on the bit width.

19. The system of claim 18, wherein the digital interface is configured to dynamically change a frequency of frame synchronization transmission sent between data frames formed of a plurality of packets of the fixed size based on feedback information from the demodulator.

* * * * *